(12) United States Patent
Chang et al.

(10) Patent No.: US 11,500,144 B2
(45) Date of Patent: Nov. 15, 2022

(54) LIGHT GUIDE PLATE, BACKLIGHT MODULE AND DISPLAY DEVICE

(71) Applicants: Radiant Opto-Electronics (Suzhou) Co., Ltd., Jiangsu (CN); Radiant Opto-Electronics Corporation, Kaohsiung (TW)

(72) Inventors: Chia-Yin Chang, Kaohsiung (TW); Po-Chang Huang, Kaohsiung (TW); Kun-Cheng Lin, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 17/444,910

(22) Filed: Aug. 12, 2021

(65) Prior Publication Data
US 2021/0373224 A1 Dec. 2, 2021

Related U.S. Application Data (63) Continuation of application No. 16/846,436, filed on Apr. 13, 2020, now Pat. No. 11,119,264, which is a
(Continued)

(30) Foreign Application Priority Data

Oct. 25, 2018 (CN) .......................... 201821739511.5

(51) Int. Cl.
 *F21V 8/00* (2006.01)
 *A01B 11/00* (2006.01)
 *A01B 1/02* (2006.01)
(52) U.S. Cl.
 CPC ............ *G02B 6/0038* (2013.01); *A01B 1/022* (2013.01); *A01B 11/00* (2013.01); *G02B 6/0061* (2013.01)

(58) Field of Classification Search
 CPC .... G02B 6/0038; G02B 6/0061; A01B 1/022; A01B 1/00
 See application file for complete search history.

(56) References Cited

U.S. PATENT DOCUMENTS 7,931,396 B2 * 4/2011 Suckling .............. G02B 6/0038
 362/330
9,835,787 B2 * 12/2017 Lee ...................... G02B 6/0043
(Continued)

FOREIGN PATENT DOCUMENTS

CN 101101097 A 1/2008
CN 102032529 A 4/2011
(Continued)

*Primary Examiner* — Arman B Fallahkhair
(74) *Attorney, Agent, or Firm* — CKC & Partners Co., LLC (57) ABSTRACT

A light guide plate includes a main body, first stripe structures and second stripe structures. The main body has an optical surface, a light-incident surface and an opposite light-incident surface. The main body has a hole passing through the optical surface, and the optical surface has a first region and a second region which are separated by an imaginary line. The imaginary line intersects the hole. The hole has a first side near the opposite light-incident surface and a second side near the light-incident surface. A portion of each of the first stripe structures is disposed in the first region. The second stripe structures are disposed in the second region. An extending direction of at least one portion of each first stripe structure is vertical to the light-incident surface, and a portion of the second stripe structures extends to the first side of the hole near the opposite light-incident surface.

20 Claims, 9 Drawing Sheets

Related U.S. Application Data continuation of application No. PCT/CN2018/120221, filed on Dec. 11, 2018.

(56) References Cited

U.S. PATENT DOCUMENTS

| | | | |
|---|---|---|---|
| 10,345,507 B2 * | 7/2019 | Yuki | G02B 6/0031 |
| 10,473,844 B2 * | 11/2019 | Han | G02B 6/0045 |
| 10,545,277 B2 * | 1/2020 | Kohsaka | G02B 6/0045 |
| 10,585,227 B2 * | 3/2020 | Kawano | G02B 6/0091 |
| 10,684,410 B2 * | 6/2020 | Li | G02B 6/0091 |
| 10,761,260 B2 * | 9/2020 | Nakajima | G02B 6/0088 |
| 10,877,317 B1 * | 12/2020 | Liu | G02F 1/133608 |
| 11,086,071 B2 * | 8/2021 | Jeon | G02B 6/0058 |
| 2014/0355300 A1 | 12/2014 | Chang et al. | |
| 2017/0336553 A1 | 11/2017 | Yuki et al. | |
| 2019/0072822 A1 * | 3/2019 | Yasunaga | G02F 1/133603 |
| 2020/0278488 A1 * | 9/2020 | Terazawa | G02B 6/0055 |

FOREIGN PATENT DOCUMENTS

| | | |
|---|---|---|
| CN | 103809235 A | 5/2014 |
| CN | 106842405 A | 6/2017 |
| CN | 206489292 U | 9/2017 |
| CN | 107448909 A | 12/2017 |
| CN | 107861188 A | 3/2018 |
| JP | 2010205613 A | 9/2010 |
| TW | 201215816 A | 4/2012 |

* cited by examiner

LIGHT GUIDE PLATE, BACKLIGHT MODULE AND DISPLAY DEVICE

RELATED APPLICATIONS

This application is a continuation application of U.S. application Ser. No. 16/846,436, filed on Apr. 13, 2020, which is a continuation application of International Application No. PCT/CN2018/120221 filed on Dec. 11, 2018, which claims priority from China Patent Application Serial Number 201821739511.5, filed on Oct. 25, 2018. The entire contents of each of which are incorporated by reference.

BACKGROUND

Field of Invention

The present disclosure relates to a light guide element and its applications. More particularly, the present disclosure relates to a light guide plate and its applications to a backlight module and a display device.

Description of Related Art

With the development of display technology, in order to increase a screen-to-body ratio, a light guide plate of a backlight module is set with a hole for accommodating a camera.

However, disposing the hole on the light guide plate will cause light traveling in the light guide plate cannot pass through the hole of the light guide plate, and thus a dark shadow will be formed at a side of the hole opposite to a side which receives the light, and thus seriously affecting the optical appearance and the light uniformity of the light guide plate.

SUMMARY

One object of the present invention is to provide a light guide plate, a backlight module and a display device, in which stripe structures of the light guide plate can increase the uniformity of light-emitting appearance of the light guide plate.

According to the aforementioned object, a light guide plate is provided. The light guide plate includes a main body, plural first stripe structures and plural second stripe structures. The main body has an optical surface, a light-incident surface and an opposite light-incident surface, in which the light-incident surface and the opposite light-incident surface are respectively connected to two opposite sides of the optical surface. The main body has a hole passing through the optical surface, and the optical surface has a first region and a second region which are separated by an imaginary line, and the imaginary line intersects the hole, in which the first region is located near the light-incident surface, and the second region is located near the opposite light-incident surface. The hole has a first side which is near the opposite light-incident surface and a second side which is near the light-incident surface. At least one portion of each of the first stripe structures is disposed in the first region. The second stripe structures are disposed in the second region. An extending direction of the at least one portion of each of the first stripe structures is vertical to the light-incident surface, and an arrangement direction or an arrangement density of the first stripe structures is different from an arrangement direction or an arrangement density of the second stripe structures.

According to the aforementioned object, another light guide plate is provided. The light guide plate includes a main body, plural first stripe structures and plural second stripe structures. The main body has an optical surface, a light-incident surface and an opposite light-incident surface, in which the light-incident surface and the opposite light-incident surface are respectively connected to two opposite sides of the optical surface. The main body has a hole passing through the optical surface, and the optical surface has a first region and a second region which are separated by an imaginary line, and the imaginary line intersects the hole, in which the first region is located near the light-incident surface, and the second region is located near the opposite light-incident surface. The hole has a first side which is near the opposite light-incident surface and a second side which is near the light-incident surface. At least one portion of each of the first stripe structures is disposed in the first region. The second stripe structures are disposed in the second region. An extending direction of the at least one portion of each of the first stripe structures is vertical to the light-incident surface, and at least one portion of the second stripe structures extends to the first side of the hole which is near the opposite light-incident surface.

According to an embodiment of the present invention, extending directions of the first stripe structures are different from extending directions of the second stripe structures.

According to an embodiment of the present invention, one end of each of the first stripe structures is connected to the light-incident surface, the other end of each of one portion of the first stripe structures extends to two opposite sides of the hole which are located along the opposite light-incident surface, and the other end of each of the other portion of the first stripe structures extends to the second side of the hole which is near the light-incident surface. one end of each of the second stripe structures is connected to the first stripe structures, and the other end of each of the second stripe structures is connected to the opposite light-incident surface, and each of the second stripe structures inclines relative to the hole.

According to an embodiment of the present invention, extending directions of the second stripe structures which are respectively located at the two opposite sides of the hole are opposite.

According to an embodiment of the present invention, a portion of the second stripe structures are intersected with each other.

According to an embodiment of the present invention, one end of each of the first stripe structures is connected to the light-incident surface, and the other end of each of the first stripe structures extends to two opposite sides of the hole which are located along the opposite light-incident surface. An extending direction of each of the second stripe structures is parallel to the opposite light-incident surface.

According to an embodiment of the present invention, the other end of each of a portion of the first stripe structures is bent relative to the hole.

According to an embodiment of the present invention, one end of each of a first portion of the first stripe structures is connected to the light-incident surface, and the other end of each of the first portion of the first stripe structures is connected to the opposite light-incident surface; one end of each of a second portion of the first stripe structures is connected to the light-incident surface, and the other end of the second portion of the first stripe structures extends to two opposite sides of the hole which are located along the opposite light-incident surface; and one end of each of a third portion of the first stripe structures is connected to the light-incident surface, and the other end of the third portion of the first stripe structures extends toward the second side of the hole which is near the light-incident surface. Each of the second stripe structures is an arc structure which surrounds the hole.

According to an embodiment of the present invention, one end of each of the first stripe structures is connected to the light-incident surface, the other end of each of one portion of the first stripe structures is connected to the opposite light-incident surface, and the other end of each of the other portion of the first stripe structures extends toward the second side of the hole which is near the light-incident surface. An extending direction of one portion of the second stripe structures is parallel to the opposite light-incident surface, one end of each of the other portion of the second stripe structures is connected to the opposite light-incident surface, the other end of each of the other portion of the second stripe structures extends to the first side of the hole which is near the opposite light-incident surface.

According to an embodiment of the present invention, one end of each of the second stripe structures is connected to the opposite light-incident surface, and the other end of each of the second stripe structures is connected to the first side of the hole which is near the opposite light-incident surface. One end of each of the first stripe structures is connected to the light-incident surface, the other end of each of one portion of the first stripe structures extends toward but is not connected to the second side of the of the hole which is near the light-incident surface to form a blank portion therebetween, and the other end of each of the other portion of the first stripe structures is connected to the opposite light-incident surface.

According to an embodiment of the present invention, one end of each of a portion of the first stripe structures is connected to the light-incident surface, the other end of each of the portion of the first stripe structures extends toward but is not connected to the second side of the of the hole which is near the light-incident surface to form a blank portion therebetween.

According to an embodiment of the present invention, the main body further comprises at least one side surface and at least one arc surface, and the light guide plate further comprises a plurality of microstructures disposed on the at least one side surface, the at least one arc surface of the main body and/or a portion of the opposite light-incident surface which is near the hole. The side surface is connected to the optical surface, the light-incident surface and the opposite light-incident surface, and the arc surface is located between the side surface and the opposite light-incident surface.

According to the aforementioned object, a backlight module is provided. The backlight module includes the aforementioned light guide plate and a light source. The light source is disposed adjacent to the light-incident surface of the main body of the light guide plate.

According to the aforementioned object, a display device is provided. The display device includes the aforementioned backlight module and a display panel. The display panel is disposed in front of the light guide plate.

According to the aforementioned embodiments of the present disclosure, the first stripe structures are used to uniform light which enters the light guide plate, and the second stripe structures are used to guide a portion of light to a side of the hole which is near the opposite light-incident surface, thereby increasing light emitting amount from the side of the hole near the opposite light-incident surface so as to increase the overall light uniformity of the light guide plate.

In addition, the opposite light-incident surface, the side surface and/or the arc surface of the main body of the light guide plate can be further set with microstructures. The microstructures can be efficiently reflected the light to a dark region at a side of the hole away from the light-incident surface, thereby improving a non-uniform phenomenon occurring around the hole.

Although the present disclosure has been described in considerable detail with reference to certain embodiments thereof, other embodiments are possible. Therefore, the spirit and scope of the appended claims should not be limited to the description of the embodiments contained herein.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
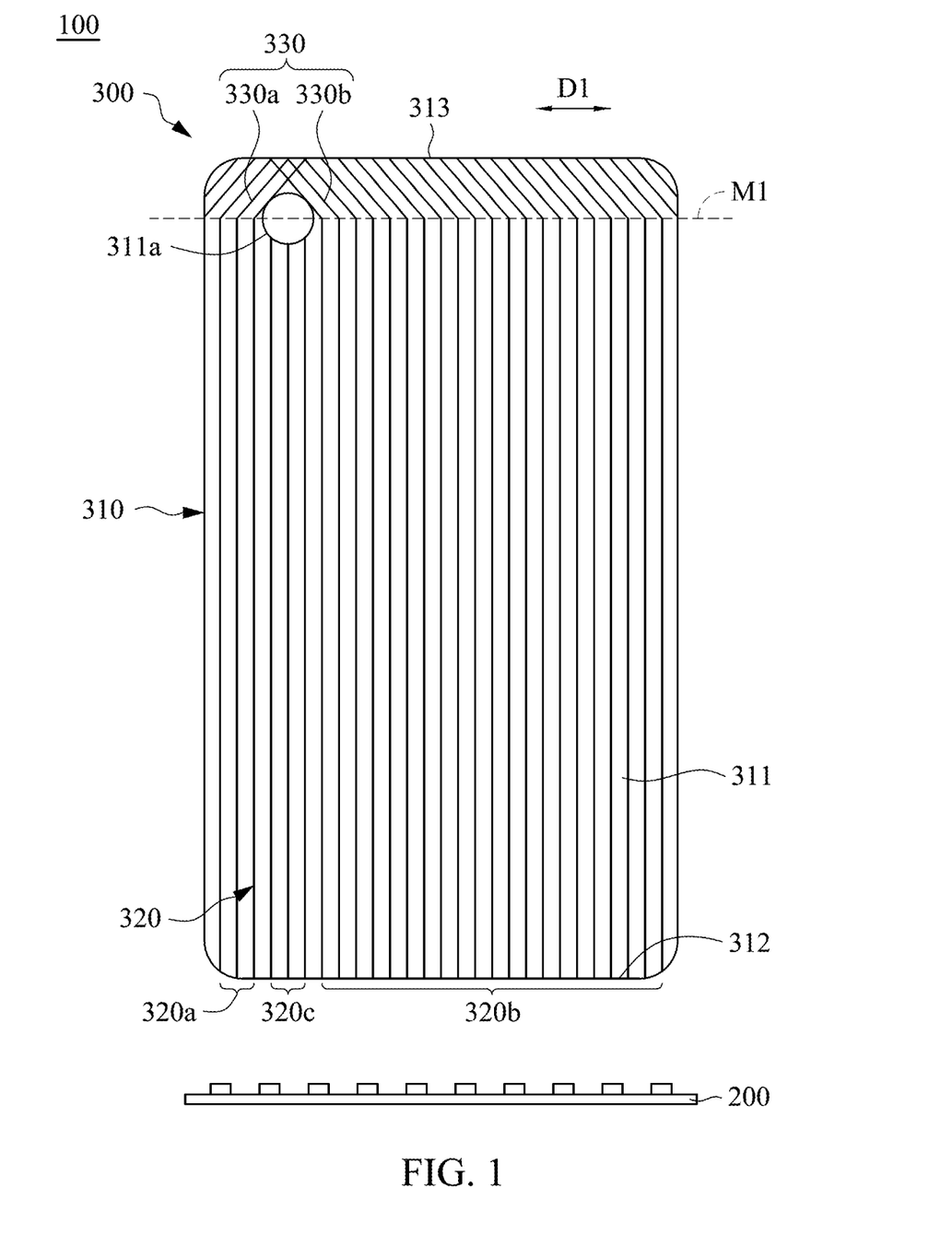
FIG. 1 is a schematic diagram showing a backlight module in accordance with a first embodiment of the present disclosure.

Referring to FIG. 1, FIG. 1 is a schematic diagram showing a backlight module 100 in accordance with a first embodiment of the present disclosure. The backlight module 100 of the present embodiment mainly includes a light source 200 and a light guide plate 300 disposed adjacent to the light source 200. The light guide plate 300 mainly includes a main body 310, plural first stripe structures 320 and plural second stripe structures 330, and the first stripe structures 320 and the second stripe structures 330 are disposed on the main body 310.

Figure 2:
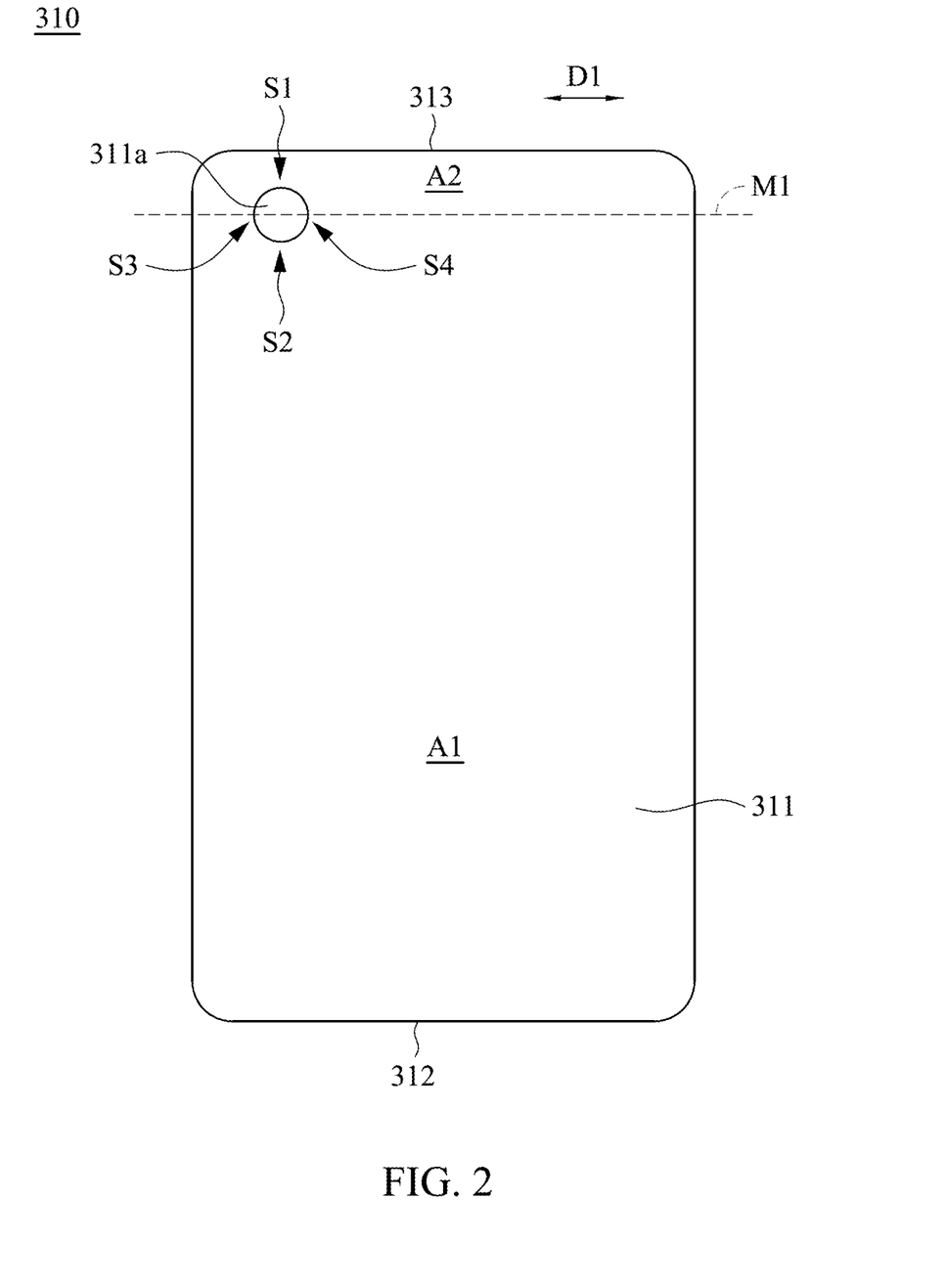
FIG. 2 is a schematic structural diagram showing a main body of a light guide plate in accordance with the first embodiment of the present disclosure.

Simultaneously referring to FIG. 2, FIG. 2 is a schematic structural diagram showing the main body 310 of the light guide plate 300 in accordance with the first embodiment of the present disclosure. More specifically, FIG. 2 omits the first stripe structures 320 and the second stripe structures 330 for clearly illustrating the structure design of the main body 310. In the present embodiment, the main body 310 has an optical surface 311, a light-incident surface 312 and an opposite light-incident surface 313, and the light-incident surface 312 and the opposite light-incident surface 313 are respectively connected to two opposite sides of the optical surface 311. The main body 310 has a hole 311a passing through the optical surface 311. In the present embodiment, the optical surface 311 is divided into a first region A1 and a second region A2 by an imaginary line M1. The first region A1 is near the light-incident surface 312, and the second region A2 is near the opposite light-incident surface 313. In one embodiment, the imaginary line M1 at least touches the hole 311a. In the present embodiment, the imaginary line M1 intersects the hole 311a. In a certain embodiment, the imaginary line M1 passes through a center of the hole 311a, and an extending direction of the imaginary line M1 is parallel to the an extending direction D1 of the opposite light-incident surface 313. In other embodiments, the imaginary line M1 can be tangent to the hole 311a according to different requirements. More specifically, the dashed line shown in FIG. 2 is merely used to partition the optical surface 311 into the first region A1 and the second region A2 for indicating the occupation ratio of first region A1 and the second region A2, and is not parts of the main body 310 of the present disclosure. In one embodiment, the optical surface 311 is a light-emitting surface or a reflecting surface.

In addition, as shown in FIG. 2, for explaining relative positions between the hole 311a and the extending directions of the first stripe structures 320 and second stripe structures 330, the present disclosure further defines that the hole 311a has a first side S1, a second side S2, a third side S3 and a fourth side S4. The first side S1 is a side of the hole 311a which is near the opposite light-incident surface 313. The second side S2 is a side of the hole 311a which is near the light-incident surface 312, and the second side S2 is opposite to the first side S1. The third side S3 and the fourth side S4 are defined at two opposite sides of the hole 311a which are located along the extending direction D1 of the opposite light-incident surface 313.

Simultaneously referring to FIG. 1 and FIG. 2, at least one portion of each of the first stripe structures 320 is located in the first region A1, and the second stripe structures 330 are disposed in the second region A2. In the present embodiment, the extending directions of the first stripe structures 320 are different from the extending directions of the second stripe structures 330. More specifically, the extending directions of each of the first stripe structures 320 are vertical to the light-incident surface 312. The second stripe structures are inclined relative to the hole 311a, and one end of each of one portion of the second stripe structures 330 is connected to the first stripe structures 320, the other end of each of one portion of the second stripe structures 330 extends towards the first side S1 of the hole 311a which is near the opposite light-incident surface 313. The first stripe structures 320 are designed to allow the light to be uniformly emitted from the light guide plate 300. The second stripe structures 33 are used to guide a portion of the light to the first side S1 of the hole 311a that is located near the opposite light-incident surface 313, thereby enabling the portion of the light to compensate the light intensity of shadow occurring at the first side S1, and thus the light guide plate 300 can emit light with more uniform luminance.

As shown in FIG. 1 and FIG. 2, in the present embodiment, the first stripe structures 320 include plural first structural units 320a, plural second structural units 320b and plural third structural units 320c. One end of each of the first structural units 320a is connected to the light-incident surface 312, and the other end of each of the first structural units 320a extends toward the third side S3 of the hole 311a. One end of each of the second structural units 320b is connected to the light-incident surface 312, and the other end of each of the second structural units 320b extends toward the fourth side S4 of the hole 311a. One end of each of the third structural units 320c is connected to the light-incident surface 312, and the other end of each of the third structural units 320c extends toward the second side S2 of the hole 311a near the light-incident surface 312. In the present embodiment, the other end of each of the third structural units 320c is connected to the hole 311a, but which is not used to limit the present disclosure. In other embodiments, the other end of each of the third structural units can be designed to be not directly connected to the hole 311a (i.e. third structural units 420c shown in FIG. 3).

As shown in FIG. 1 and FIG. 2, in the present embodiment, the second stripe structures 330 include plural first structural units 330a and plural second structural units 330b. The first structural units 330a and second structural units 330b are respectively located at two opposite sides (i.e. the third side S3 and the fourth side S4) of the hole 311a along the opposite light-incident surface 313. In the present embodiment, an extending direction of the first structural units 330a is opposite to an extending direction of the second structural units 330b, and a portion of each of a portion of the first structural units 330a which extends to the first side S1 of the hole 311a and a portion of each of a portion of the second structural units 330b which extends to the first side S1 of the hole 311a are intersected, thereby increasing light emitting amount from the first side S1 of the hole 311a near the opposite light-incident surface 313. Therefore, the design of the second stripe structures 330 can increase the light emitting amount from the side of the hole 311a away from the light-incident surface 312, thereby increasing the overall light uniformity of the light guide plate 300.

Figure 3:
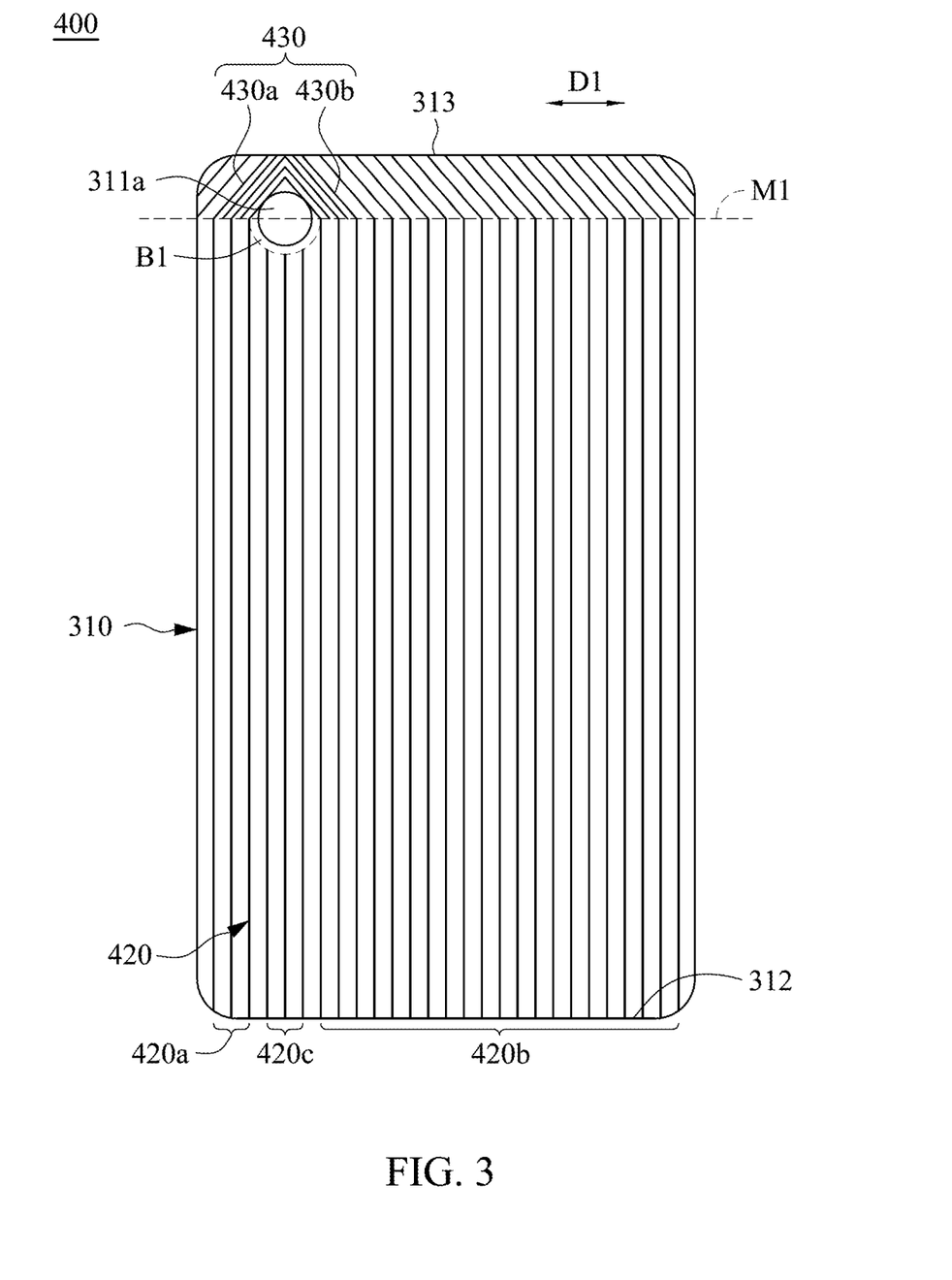
FIG. 3 is a schematic diagram showing a light guide plate in accordance with a second embodiment of the present disclosure.

Referring to FIG. 2 and FIG. 3, FIG. 3 is a schematic diagram showing a light guide plate 400 in accordance with a second embodiment of the present disclosure. The structure of the light guide plate 400 shown in FIG. 3 is similar to that of the light guide plate 300 shown in FIG. 1, and the main difference therebetween is that first stripe structures 420 and second stripe structures 430 of the light guide plate 400 have different structural designs. In the present embodiment, the first stripe structures 420 are disposed in the first region A1, and the second stripe structures 430 are disposed in the second region A2. An extending direction of each of the first stripe structures 420 is vertical to the light-incident surface 312. The second stripe structures 430 are inclined relative to the hole 311a. One end of a portion of each of the second stripe structures 430 is connected to the first stripe structures 420, the other end of the portion of each of the second stripe structures 430 extends toward the first side S1 of the hole 311a near the opposite light-incident surface 313.

In the embodiment of FIG. 3, the first stripe structures 420 include plural first structural units 420a, plural second structural units 420b and plural third structural units 420c. One end of each of the first structural units 420a is connected to the light-incident surface 312, and the other end of each of the first structural units 420a extends toward the third side S3 of the hole 311a. One end of each of the second structural units 420b is connected to the light-incident surface 312, and the other end of each of the second structural units 420b extends toward the fourth side S4 of the hole 311a. One end of each of the third structural units 420c is connected to the light-incident surface 312, and the other end of each of the third structural units 420c extends toward the second side S2 of the hole 311a near the light-incident surface 312 but is not connected to the hole 311a. In other words, there is a blank portion B1 formed between the third structural units 420c and the hole 311a (i.e. the blank portion B1 is located at the second side S2 of the hole 311a). The design of the blank portion B1 is mainly used to decrease light emitting amount from the second side S2 of the hole 311a that is located near the light-incident surface 312, thereby preventing the light from concentrating at the second side S2 of the hole 311a.

As shown in FIG. 2 and FIG. 3, in the present embodiment, the second stripe structures 430 include plural first structural units 430a and plural second structural units 430b. The first structural units 430a and the second structural units 430b are respectively located at two opposite sides (i.e. the third side S3 and the fourth side S4) of the hole 311a along the opposite light-incident surface 313. In the present embodiment, an extending direction of the first structural units 430a is opposite to an extending direction of the second structural units 430b. One end of a portion of each of the first structural units 430a which extends to the first side S1 of the hole 311a is connected to one end of a portion of each of the second structural units 430b which extends to the first side S1 of the hole 311a. Moreover, in the present embodiment, an arrangement density of the first structural units 430a which are located near the hole 311a is greater than an arrangement density of the first structural units 430a which are located away from the hole 311a, and an arrangement density of the second structural units 430b which are located near the hole 311a is greater than an arrangement density of the second structural units 430b which are located away from the hole 311a. Therefore, the design of the second stripe structures 430 can guide a portion of the light to the first side S1 of the hole 311a that is located near the opposite light-incident surface 313, thereby enabling the portion of the light to compensate the light intensity of shadow occurring at the first side S1, thereby increasing light emitting amount from the side of the hole 311a away from the light-incident surface 312, and thus the light guide plate 400 can emit light with more uniform luminance.

Figure 4:
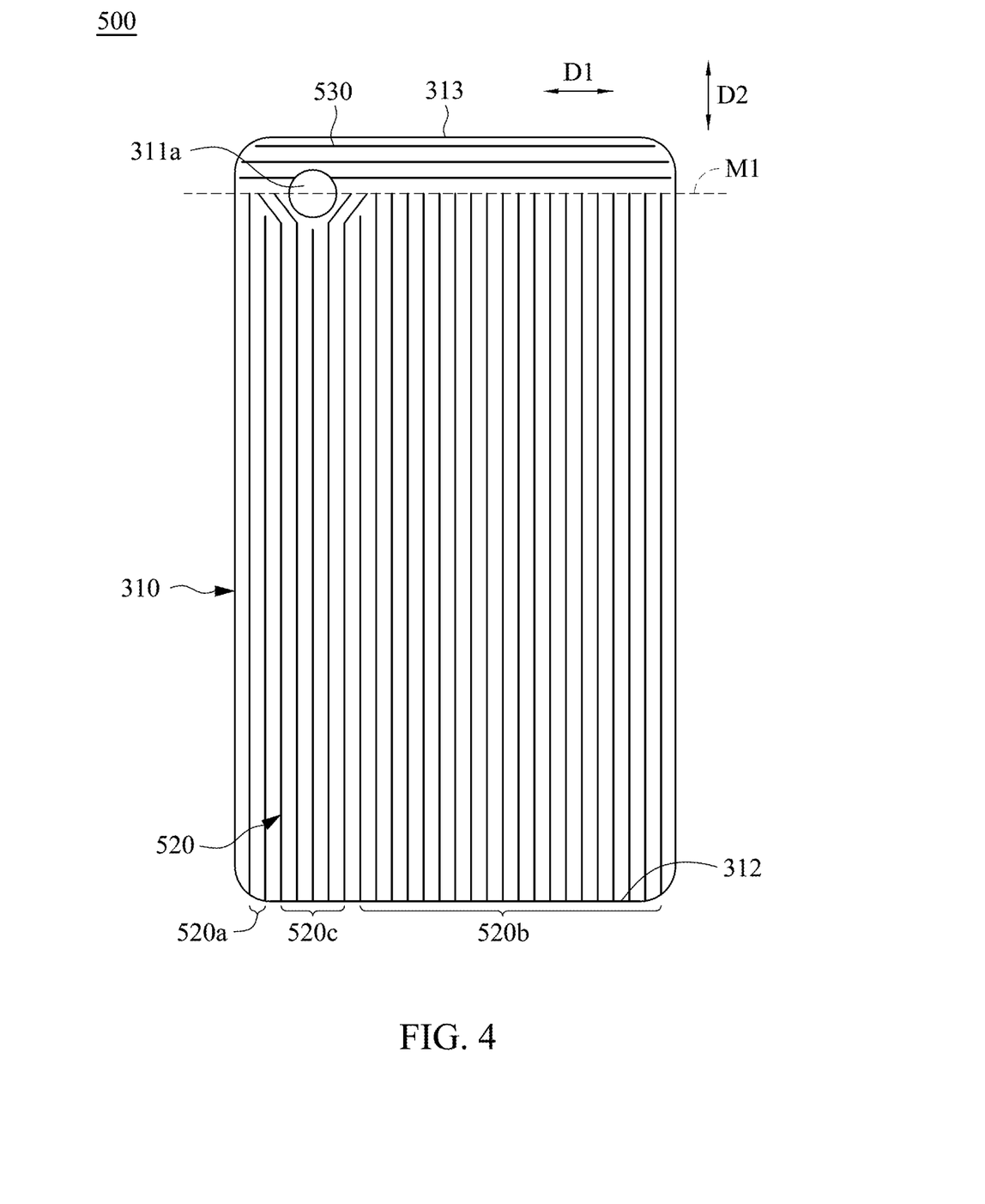
FIG. 4 is a schematic diagram showing a light guide plate in accordance with a third embodiment of the present disclosure.

Referring to FIG. 2 and FIG. 4, FIG. 4 is a schematic diagram showing a light guide plate 500 in accordance with a third embodiment of the present disclosure. The structure of the light guide plate 500 shown in FIG. 4 is similar to that of the light guide plate 300 shown in FIG. 1, and the main difference therebetween is that first stripe structures 520 and second stripe structures 530 of the light guide plate 500 have different structural designs. In the present embodiment, arrangement directions of the first stripe structures 520 are different from arrangement directions of the second stripe structures 530. The first stripe structures 520 are arranged along the extending direction D1 of the opposite light-incident surface 313, and the second stripe structures 530 are arranged along an extending direction D2. The extending direction D2 is vertical to the extending direction D1 of the opposite light-incident surface 313. In addition, an extending direction of at least one portion of each of the first stripe structures 520 is vertical to the light-incident surface 312, and an extending direction of each of the second stripe structures 530 is parallel to the extending direction D1 of the opposite light-incident surface 313.

In the embodiment of FIG. 4, the first stripe structures 520 include plural first structural units 520a, plural second structural units 520b and plural third structural units 520c. One end of each of the first structural units 520a is connected to the light-incident surface 312, and the other end of each of the first structural units 520a extends toward the third side S3 of the hole 311a. One end of each of the second structural units 520b is connected to the light-incident surface 312, and the other end of each of the second structural units 520b extends toward the fourth side S4 of the hole 311a. One end of each of the third structural units 520c is connected to the light-incident surface 312, and the other end each of the third structural units 520c is bent relative to the hole 311a. More specifically, the third structural units 520c extend from the light-incident surface 312 toward the second side S2 of the hole 311a that is located near the light-incident surface 312, and then are bent away from the hole 311a. Therefore, the design of bent portions of the third structural units 520c can guide the light which travels to the second side S2 of the hole 311a to the third side S3 and the fourth side S4 of the hole 311a respectively, thereby preventing the light from concentrating at the second side S2 of the hole 311a near the light-incident surface 312.

As shown in FIG. 2 and FIG. 4, in the present embodiment, the extending direction of the second stripe structures 530 is parallel to the extending direction D1 of the opposite light-incident surface 313. The second stripe structures 530 not only can uniform the light which is guided to the third side S3 and the fourth side S4 of the hole 311a, but also can guide a portion of the light to the first side S1 of the hole 311a that is located near the opposite light-incident surface 313, thereby enabling the portion of the light to compensate the light intensity of shadow occurring at the first side S1, thereby increasing light emitting amount from the side of the hole 311a away from the light-incident surface 312, and thus the light guide plate 400 can emit light with more uniform luminance.

Figure 5:
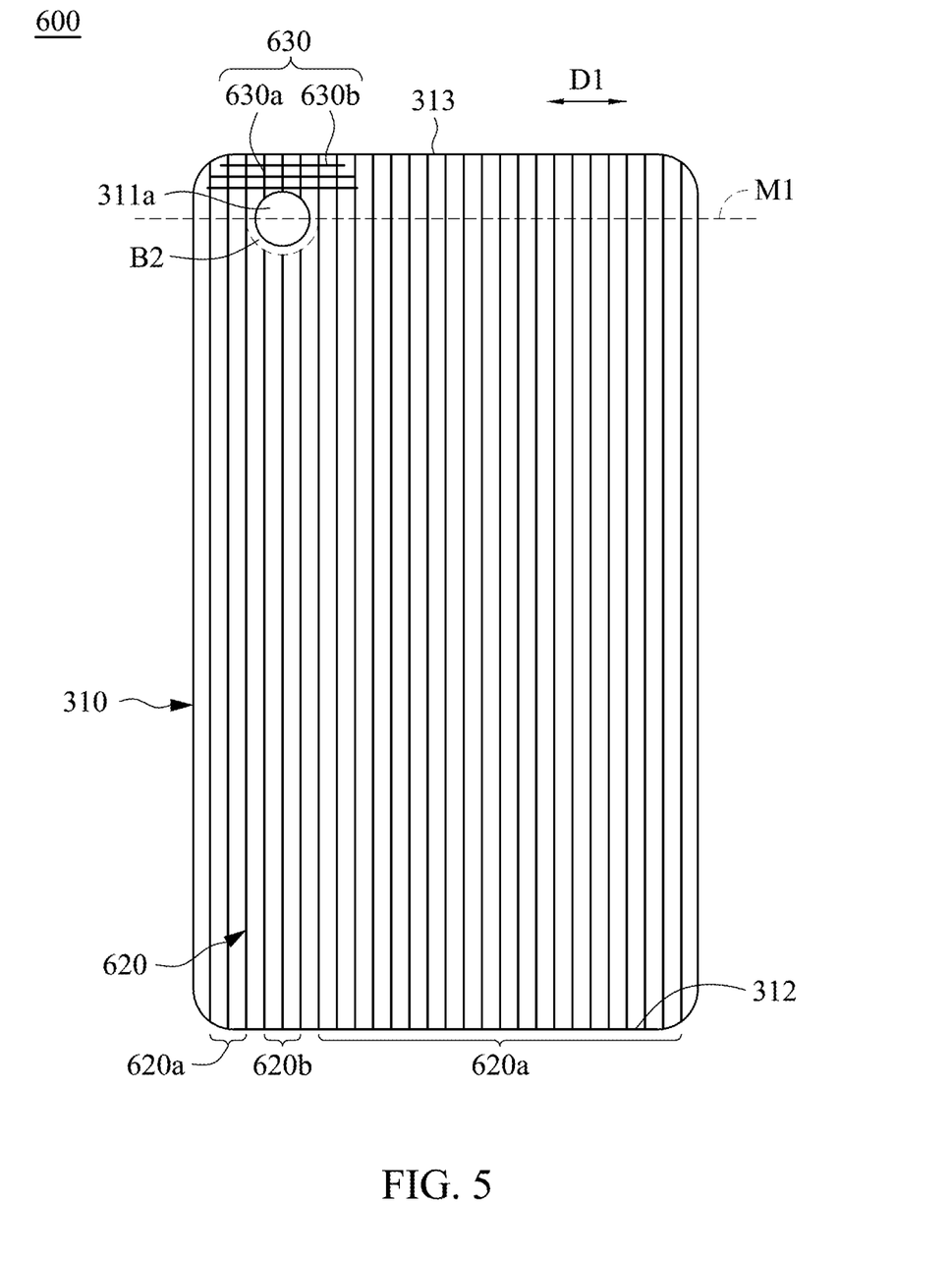
FIG. 5 is a schematic diagram showing a light guide plate in accordance with a fourth embodiment of the present disclosure.

Referring to FIG. 2 and FIG. 5, FIG. 5 is a schematic diagram showing a light guide plate 600 in accordance with a fourth embodiment of the present disclosure. The structure of the light guide plate 600 shown in FIG. 5 is similar to that of the light guide plate 500 shown in FIG. 4, and the main difference therebetween is that first stripe structures 620 and second stripe structures 630 of the light guide plate 600 have different structural designs. In the present embodiment, at least one portion of each of the first stripe structures 620 is located in the first region A1, and the second stripe structures 630 are disposed in the second region A2. An extending direction of the first stripe structures 620 is vertical to the light-incident surface 312, and an extending direction of a portion of each of the second stripe structures 630 is parallel to the extending direction D1 of the opposite light-incident surface 313.

In the embodiment of FIG. 5, the first stripe structures 620 include plural first structural units 620a and plural second structural units 620b. One end of each of the first structural units 620a is connected to the light-incident surface 312, the other end of each of the first structural units 620a is connected to the opposite light-incident surface 313. One end of each of the second structural units 620b is connected to the light-incident surface 312, the other end of each of the second structural units 620b extends toward the second side S2 of the hole 311a that is located near the light-incident surface 312. In the present embodiment, the other end of each of the second structural units 620b is not directly connected to the hole 311a. In other words, there is a blank portion B2 formed between the hole 311a and the second structural units 620b (i.e. the blank portion B2 is located at the second side S2 of the hole 311a). The design of the blank portion B2 is mainly used to decrease light emitting amount from the second side S2 of the hole 311a that is located near the light-incident surface 312, thereby preventing the light from concentrating at the second side S2 of the hole 311a.

As shown in FIG. 2 and FIG. 5, in the present embodiment, the second stripe structures 630 include plural first structural units 630a and plural second structural units 630b.

An extending direction of the first structural units 630a is vertical to the extending direction D1 of the opposite light-incident surface 313. One end of each of the first structural units 630a is connected to the opposite light-incident surface 313, and the other end of each of the first structural units 630a is connected to the first side S1 of the hole 311a that is located near the opposite light-incident surface 313. An extending direction of the second structural units 630b is parallel to the extending direction D1 of the opposite light-incident surface 313. The second structural units 630b are intersected with the first structural units 630a so as to form a higher arrangement density of the second stripe structures 630 at the first side S1 of the hole 311a that is located near the opposite light-incident surface 313. Therefore, the design of the second stripe structures 630 can increase the light emitting amount from the side of the hole 311a away from the light-incident surface 312, thereby increasing the overall light uniformity of the light guide plate 600.

Figure 6:
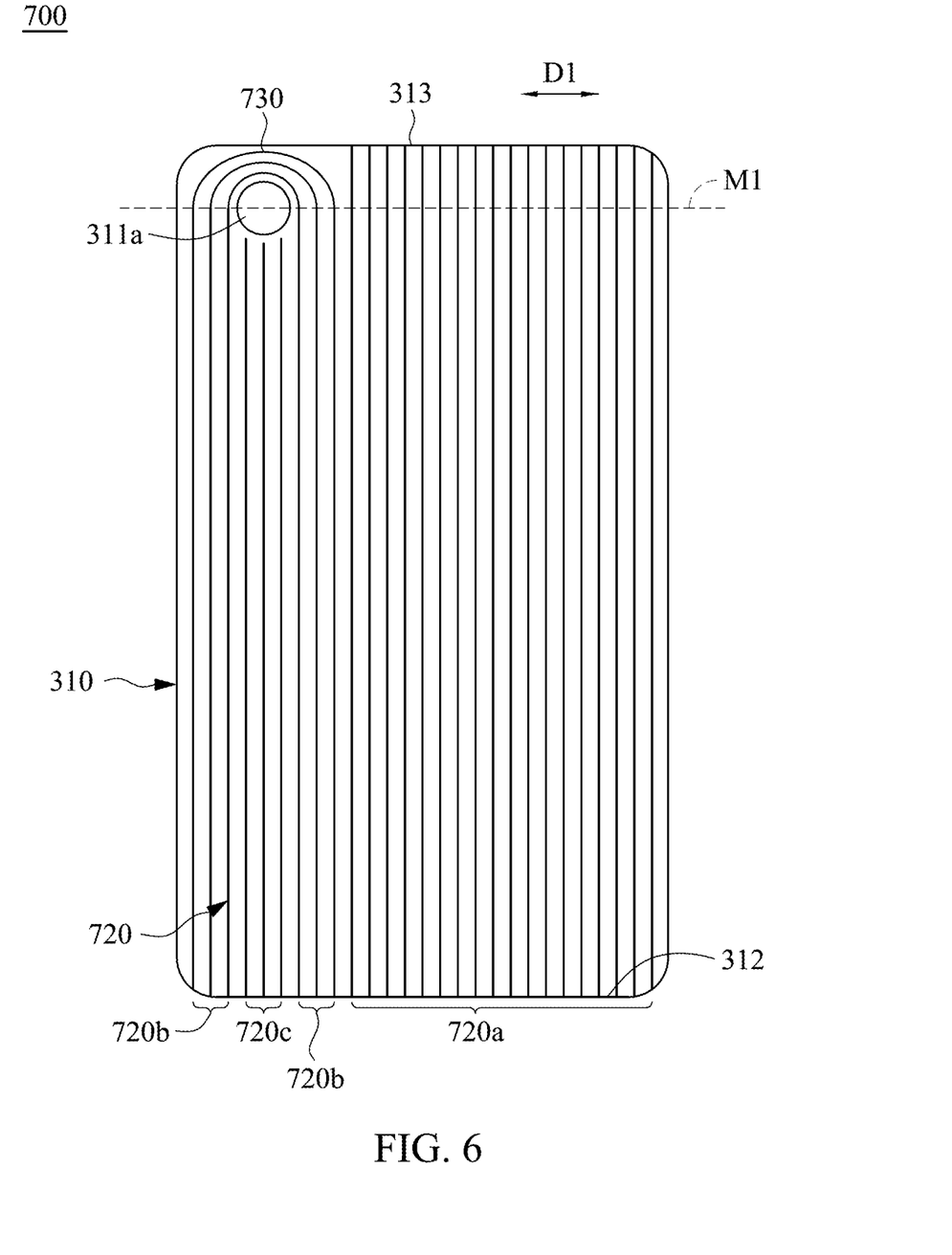
FIG. 6 is a schematic diagram showing a light guide plate in accordance with a fifth embodiment of the present disclosure.

Referring to FIG. 2 and FIG. 6, FIG. 6 is a schematic diagram showing a light guide plate 700 in accordance with a fifth embodiment of the present disclosure. The structure of the light guide plate 700 shown in FIG. 6 is similar to that of the light guide plate 600 shown in FIG. 5, and the main difference therebetween is that first stripe structures 720 and second stripe structures 730 of the light guide plate 700 have different structural designs. In the present embodiment, at least one portion of each of the first stripe structures 720 is located in the first region A1, and the second stripe structures 730 are disposed in the second region A2. In the present embodiment, an extending direction of the first stripe structures 720 is different from an extending direction of the second stripe structures 730. More specifically, the extending direction of the first stripe structures 720 is vertical to the light-incident surface 312, and the second stripe structures 730 extend along the contour of the hole 311a.

In the embodiment of FIG. 6, the first stripe structures 720 include plural first structural units 720a, plural second structural units 720b and plural third structural units 720c. One end of each of the first structural units 720a is connected to the light-incident surface 312, and the other end of each of the first structural units 720a is connected to the opposite light-incident surface 313. One end of each of one portion of the second structural units 720b is connected to the light-incident surface 312, the other end of each of one portion of the second structural units 720b extends toward the third side S3 of the hole 311a. One end of each of the other one portion of the second structural units 720b is connected to the light-incident surface 312, the other end of each of the other one portion of the second structural units 720b extends toward the fourth side S4 of the hole 311a. One end of each of the third structural units 720c is connected to the light-incident surface 312, the other end of each of the third structural units 720c extends toward the second side S2 of the hole 311a that is located near the light-incident surface 312. In the present embodiment, the other end of each of the third structural units 720c is not directly connected to the hole 311a, thereby preventing the light from concentrating at the second side S2 of the hole 311a.

As shown in FIG. 2 and FIG. 6, in the present embodiment, the second stripe structures 730 are arc structures which surround the hole 311a. In some examples, two opposing ends of each of the arc structures are connected to the second structural units 720b of the first stripe structures 720. Therefore, the design of the second stripe structures 730 can guide a portion of light to the first side S1 of the hole 311a that is located near the opposite light-incident surface 313, thereby enabling the portion of the light to compensate the light intensity of shadow occurring at the first side S1 of the hole 311a near the opposite light-incident surface 313, and thus the light guide plate 700 can emit light with more uniform luminance.

Figure 7:
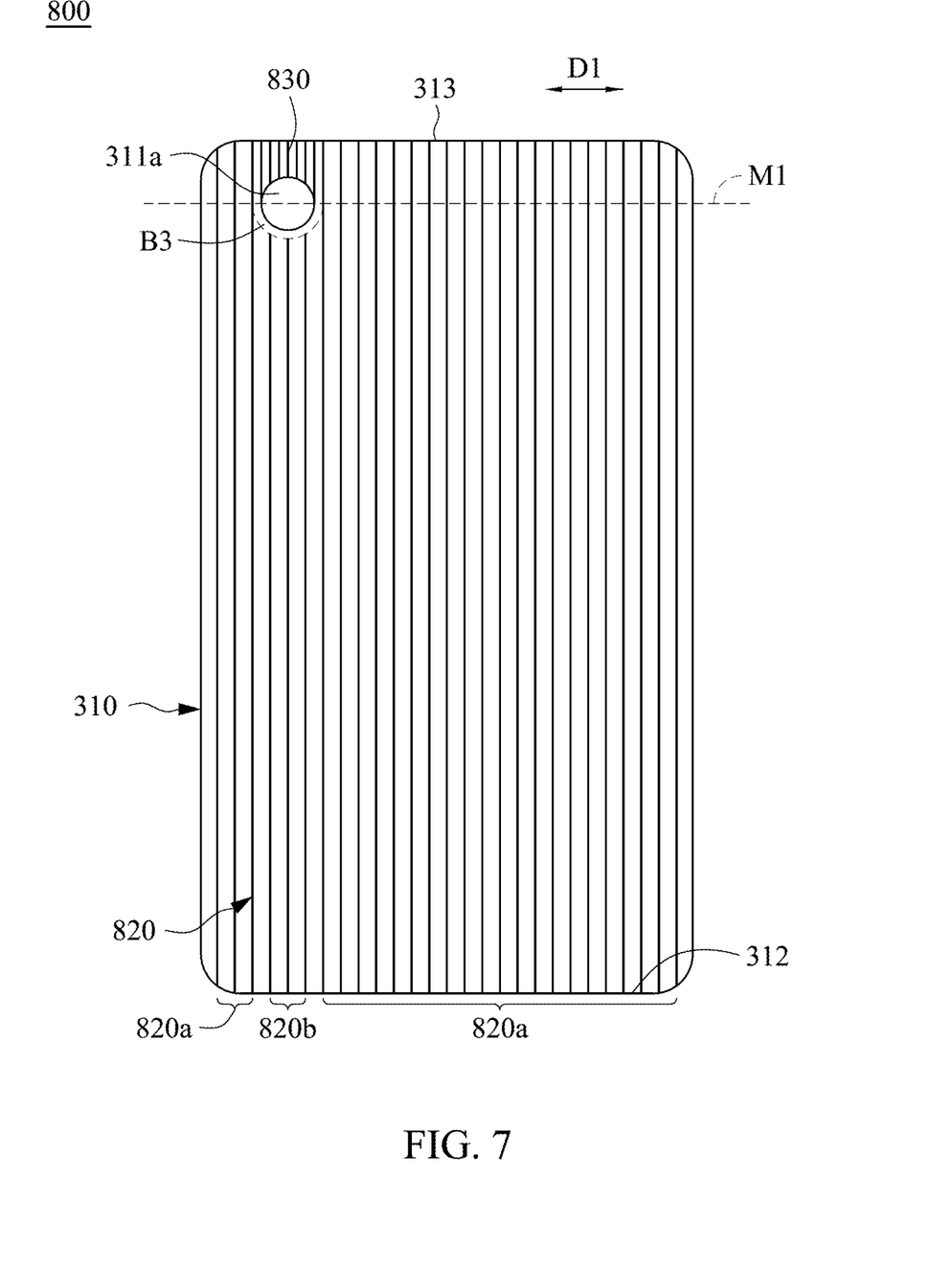
FIG. 7 is a schematic diagram showing a light guide plate in accordance with a sixth embodiment of the present disclosure.

Referring to FIG. 2 and FIG. 7, FIG. 7 is a schematic diagram showing a light guide plate 800 in accordance with a sixth embodiment of the present disclosure. The structure of the light guide plate 800 shown in FIG. 7 is similar to that of the light guide plate 700 shown in FIG. 6, and the main difference therebetween is that first stripe structures 820 and second stripe structures 830 of the light guide plate 800 have different structural designs. In the present embodiment, at least one portion of each of the first stripe structures 820 is located in the first region A1, the second stripe structures 830 are disposed in the second region A2. In the present embodiment, an extending direction of the first stripe structures 820 is vertical to the light-incident surface 312. The second stripe structures 830 extend to the first side S1 of the hole 311a near the opposite light-incident surface 313.

In the embodiment of FIG. 7, the first stripe structures 820 include plural first structural units 820a and plural second structural units 820b. One end of each of the first structural units 820a is connected to the light-incident surface 312, and the other end of each of the first structural units 820a is connected to the opposite light-incident surface 313. One end of each of the second structural units 820b is connected to the light-incident surface 312, and the other end of each of the second structural units 820b extends toward the second side S2 of the hole 311a that is located near the light-incident surface 312 but is not directly connected to the hole 311a. In the present embodiment, there is a blank portion B3 formed between the hole 311a and the second structural units 820b. The design of the blank portion B3 is mainly used to decrease light emitting amount from the second side S2 of the hole 311a that is located near the light-incident surface 312, thereby preventing the light from concentrating at the second side S2 of the hole 311a.

As shown in FIG. 2 and FIG. 7, in the present embodiment, one end of each of the second stripe structures 830 is connected to the opposite light-incident surface 313, the other end of each of the second stripe structures 830 is directly connected to the first side S1 of the hole 311a that is located near the opposite light-incident surface 313. In addition, an arrangement distance between any two adjacent second stripe structures 830 is smaller than an arrangement distance between any two adjacent first stripe structures 820. In other words, an arrangement density of the second stripe structures 830 is greater than an arrangement density of the first stripe structures 820. Therefore, the design of the second stripe structures 830 can increase the light emitting amount at the first side S1 of the hole 311a that is located near the opposite light-incident surface 313, thereby enabling a portion of the light to compensate the light intensity of shadow occurring at the first side S1 of the hole 311a near the opposite light-incident surface 313, and thus the light guide plate 800 can emit light with more uniform luminance.

More specifically, the aforementioned first stripe structures and second stripe structures are lenticular structures having V-shaped or arc shaped cross sections. Moreover, the first stripe structures and the second stripe structures can be convex structures or concave structures.

Figure 8:
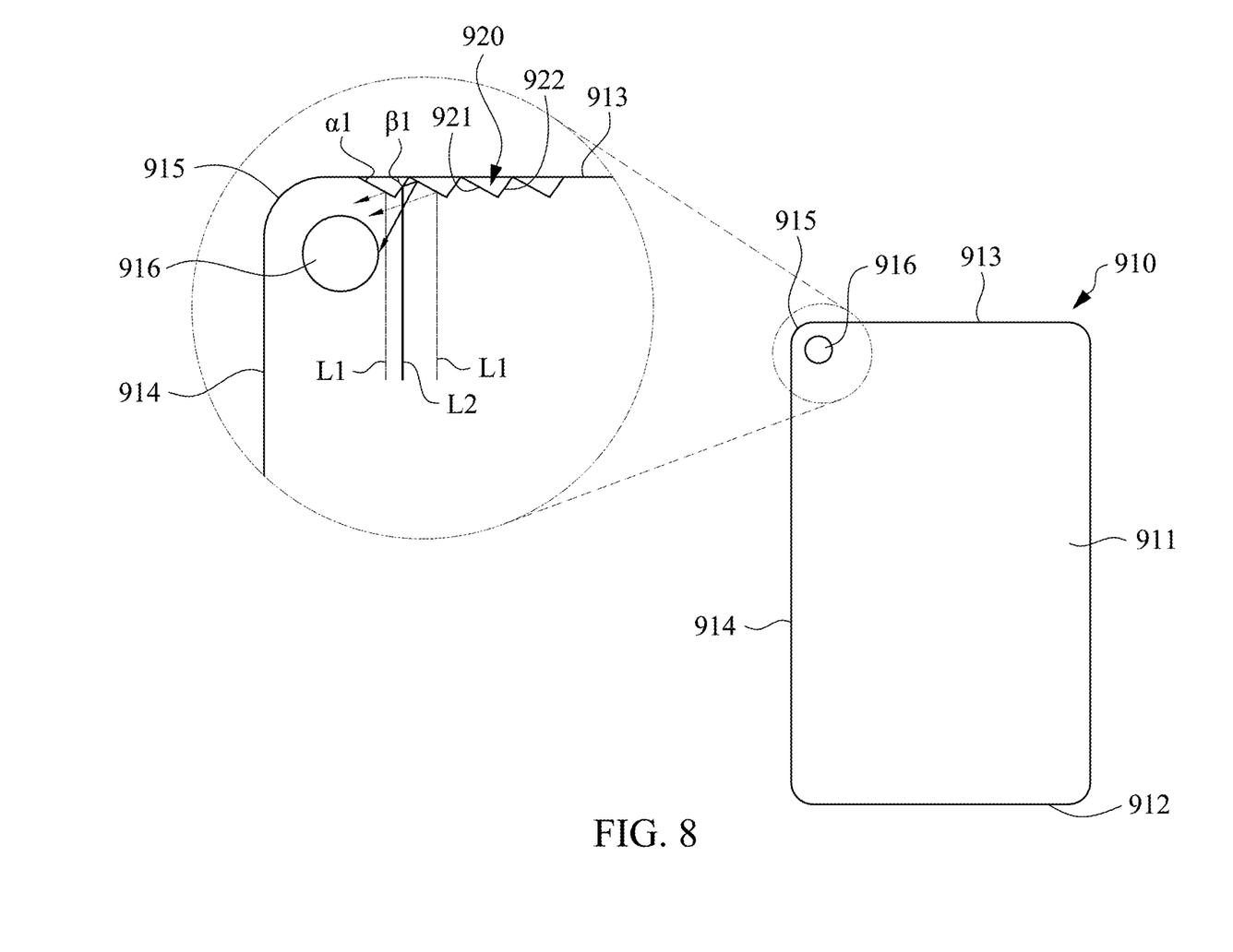
FIG. 8 is a schematic structural diagram showing a main body in accordance with another embodiment of the present disclosure.

In some embodiments, the main body has different designs to be cooperated with different first stripe structures and second stripe structures as shown in FIG. 1 and FIGS. 3-7 to generate different optical effects. Referring to FIG. 8, FIG. 8 is a schematic structural diagram showing a main body 910 in accordance with another embodiment of the present disclosure. The structure of the main body 910 of the present embodiment is similar to that of the main body 310 shown in FIG. 2, and the main difference therebetween is that the main body 910 further includes microstructures 920. The main body 910 has an optical surface 911, a light-incident surface 912, an opposite light-incident surface 913 and at least one side surface 914 and at least one arc surface 915. In one embodiment, the optical surface 911 is a light-emitting surface or a reflecting surface. As shown in FIG. 8, the main body 910 has a hole 916 passing through the optical surface 911. In the present embodiment, the microstructures 920 are disposed on a portion of the opposite light-incident surface 913 which is near the hole 916.

In some embodiments, as shown in FIG. 8, the microstructures 920 are concave structures, and each of the microstructures 920 is an asymmetric triangle structure. Each of the microstructures 920 has a first inclined surface 921 and a second inclined surface 922 which are inclined relative to the opposite light-incident surface 913. There is a first included angle α1 formed between the first inclined surface 921 and the opposite light-incident surface 913, and there is a second included angle β1 formed between the second inclined surface 922 and the opposite light-incident surface 913. The first included angle α1 is smaller than the second included angle β1, and both the first included angle α1 and the second included angle β1 are acute angles. In the present embodiment, the inclination of the first inclined surface 921 is smaller than the inclination of the second inclined surface 922, and a dimension of the first inclined surface 921 is greater than a dimension of the second inclined surface 922. Therefore, light beam emitting toward the first inclined surface 921 (i.e. light beam L1) is reflected by the first inclined surface 921 to emit toward the side of the hole 916 which is near the opposite light-incident surface 913. Moreover, light beam emitting toward the second inclined surface 922 (i.e. light beam L2) is first reflected by the second inclined surface 922 to emit toward the first inclined surface 921 and further emit to the side of the hole 916 which is near the opposite light-incident surface 913. Therefore, the design of the microstructures 920 can guide a portion of the light to the side S1 of the hole 916 that is located near the opposite light-incident surface 913, thereby enabling the portion of the light to compensate the light intensity of shadow occurring at the side of the hole 916 that is located near the opposite light-incident surface 913, and thus the light guide plate can emit light with more uniform luminance. It is noted that, the microstructures 920 are not limited to have asymmetric triangle shapes. In other embodiments, the microstructures 920 can have symmetric triangle shapes, arc shapes or other shapes. In addition, the microstructures 920 can be designed to be convex structures according to requirements, or the e microstructures 920 can be designed to be disposed on the opposite light-incident surface 913 and/or side surface 914.

Figure 9:
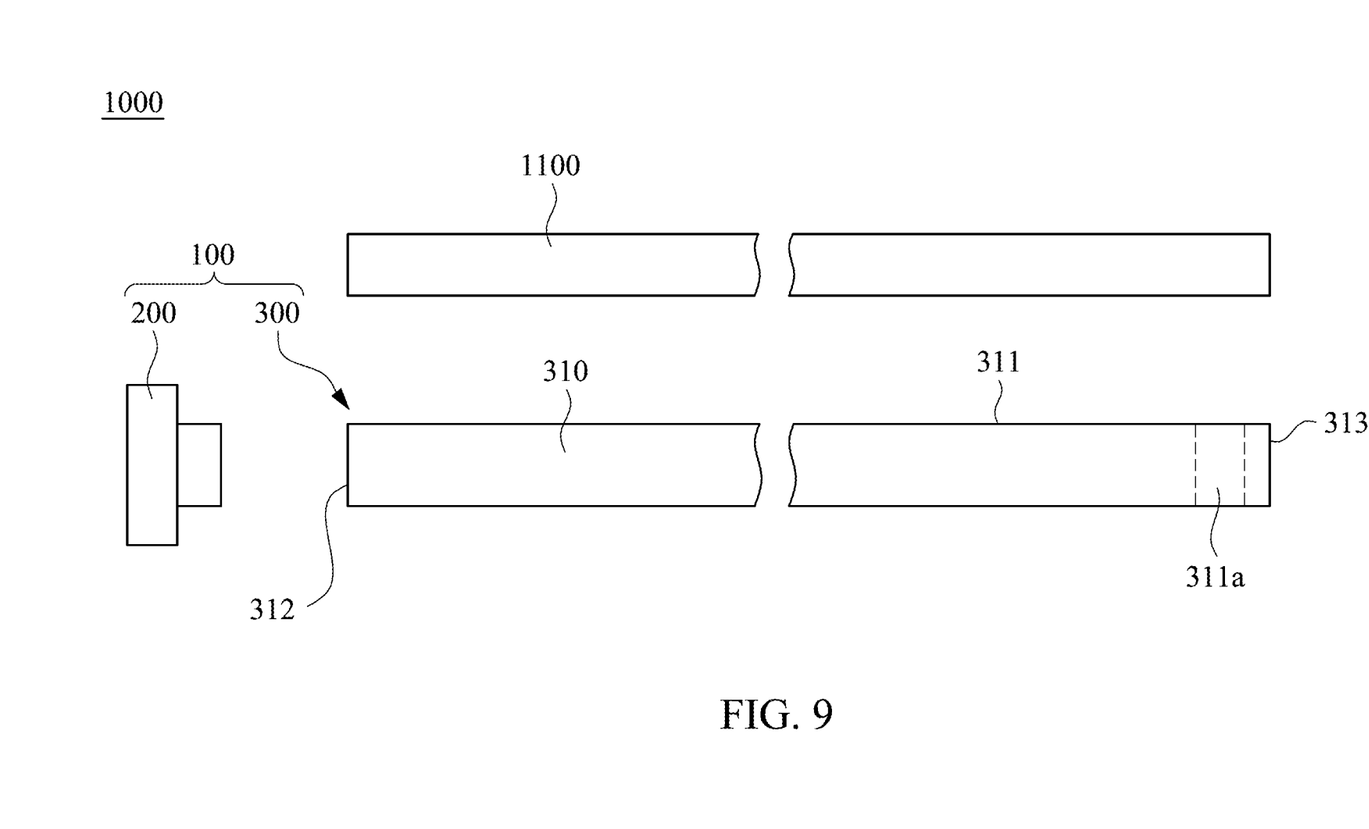
FIG. 9 is a schematic diagram showing a display device in accordance with an embodiment of the present disclosure.

Referring to FIG. 9, FIG. 9 is a schematic diagram showing a display device 1000 in accordance with an embodiment of the present disclosure. The display device 1000 of the present embodiment includes the backlight module 100 shown in FIG. 1 and a display panel 1100. As shown in FIG. 9, the display panel 1100 is disposed in front of the light guide plate 300 of the backlight module 100. It is noted that, the backlight module 100 shown in FIG. 1 is merely used as an example which can be applied to the display device 1000 for explanation, and embodiments of the present disclosure are not limited thereto. In other embodiments, other light guide plates, such as light guide plates 400, 500, 600, 700 and 800, or the light guide plate having the main body 910, of the aforementioned embodiments also can be applied to a display device, so as to achieve the same effect.

According to the aforementioned embodiments of the present disclosure, the first stripe structures are used to uniform light which enters the light guide plate, and the second stripe structures are used to guide a portion of light to a side of the hole which is near the opposite light-incident surface, thereby increasing light emitting amount from the side of the hole near the opposite light-incident surface so as to increase the overall light uniformity of the light guide plate.

In addition, the opposite light-incident surface, the side surface and/or the arc surface of the main body of the light guide plate can be further set with microstructures. The microstructures can efficiently reflect the light to a dark region at a side of the hole away from the light-incident surface, thereby improving a non-uniform phenomenon occurring around the hole.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A light guide plate, comprising:
   a main body having an optical surface, a light-incident surface and an opposite light-incident surface, wherein the light-incident surface and the opposite light-incident surface are respectively connected to two opposite sides of the optical surface, wherein the main body has a hole formed on the optical surface, and a front blank portion is located adjacent to a side of the hole in a direction facing towards the light-incident surface, and a rear structure portion is located adjacent to at a side of the hole in a direction facing towards the opposite light-incident surface; and
   a plurality of stripe structures located on the optical surface except for the hole, the front blank portion and the rear structure portion;
   wherein the front blank portion is a region with no structure;
   wherein each of the stripe structures in a first grouping is pointed to the hole, extends toward the hole near the light-incident surface but is not connected to the hole to keep the front blank portion between the stripe structures and the hole;
   wherein a plurality of rear stripe structures are located in the rear structure portion of the optical surface; and
   wherein extending directions of the stripe structures are identical to extending directions of the rear stripe structures.

2. The light guide plate of claim 1, wherein the front blank portion and the rear structure portion are separated by an imaginary line.

3. The light guide plate of claim 2, wherein the imaginary line is parallel to the light-incident surface and intersects a center of the hole.

4. A backlight module, comprising:
a light guide plate of claim 1; and
a light source disposed adjacent to the light-incident surface of the main body of the light guide plate.

5. A display device, comprising:
a backlight module of claim 4; and
a display panel disposed in front of the light guide plate.

6. The light guide plate of claim 1, wherein an extending direction of at least one portion of each of the stripe structures is vertical to the light-incident surface, one end of each of the stripe structures in the first grouping is connected to the light-incident surface, the other end of each of the stripe structures in the first grouping extends toward a border of the front blank portion.

7. The light guide plate of claim 1, wherein the rear stripe structures are disconnected with the stripe structures by the front blank portion.

8. The light guide plate of claim 1, wherein an arrangement density of the rear stripe structures in the rear structure portion is greater than an arrangement density of the stripe structures.

9. The light guide plate of claim 1, wherein
one end of each of the stripe structures in the first grouping is connected to the light-incident surface, the other end of each of the stripe structures in the first grouping extends toward a border of the front blank portion;
one end of each of the rear stripe structures is connected to the opposite light-incident surface, and the other end of each of the rear stripe structures is connected to the hole; and
one end of each of the stripe structures is connected to the light-incident surface, and the other end of each of the stripe structures in a second grouping is connected to the opposite light-incident surface.

10. The light guide plate of claim 1, wherein the optical surface is a light-emitting surface.

11. The light guide plate of claim 1, wherein the main body further comprises at least one side surface and at least one arc surface, and the light guide plate further comprises a plurality of microstructures disposed on a portion of the opposite light-incident surface which is closer to the hole, wherein the side surface is connected to the optical surface, the light-incident surface and the opposite light-incident surface, and the arc surface is located between the side surface and the opposite light-incident surface.

12. The light guide plate of claim 1, wherein a maximum width of the front blank portion which is parallel to the light-incident surface is greater than a maximum width of the hole which is parallel to the light-incident surface.

13. The light guide plate of claim 1, wherein the front blank portion, the hole and the rear structure portion are in a linear arrangement from the light-incident surface toward the opposite light-incident surface.

14. A light guide plate, comprising:
a main body having an optical surface, a light-incident surface and an opposite light-incident surface, wherein the light-incident surface and the opposite light-incident surface are respectively connected to two opposite sides of the optical surface, wherein the main body has a hole formed on the optical surface, and a front blank portion is located adjacent to a side of the hole in a direction facing towards the light-incident surface, and a rear structure portion is located adjacent to a side of the hole in a direction facing towards the opposite light-incident surface; and
a plurality of stripe structures located on the optical surface except for the hole, the front blank portion and the rear structure portion;
wherein the front blank portion is a region with no structure;
wherein each of the stripe structures in a first grouping is pointed to the hole, extends toward the hole near the light-incident surface but is not connected to the hole to keep the front blank portion between the stripe structures and the hole;
wherein a plurality of rear stripe structures are located in the rear structure portion of the optical surface, and wherein extending directions of the stripe structures are different from extending directions of the rear stripe structures.

15. The light guide plate of claim 14, wherein
one end of each of the stripe structures in the first grouping is connected to the light-incident surface, the other end of each of the stripe structures in the first grouping extends toward a border of the front blank portion;
one end of each of the stripe structures is connected to the light-incident surface, and another end of each of the stripe structures in a second grouping extends to positions level with two opposite sides of the hole in a direction along the opposite light-incident surface; and
an extending direction of each of the rear stripe structures is parallel to the opposite light-incident surface.

16. The light guide plate of claim 15, wherein the other end of each of the stripe structures in a third grouping is bent relative to the hole.

17. The light guide plate of claim 14, wherein
one end of each of the stripe structures in the first grouping is connected to the light-incident surface, the other end of each of the stripe structures in the first grouping extends toward a border of the front blank portion;
one end of each of the stripe structures is connected to the light-incident surface, the other end of each of the stripe structures in a second grouping extends to positions level with two opposite sides of the hole in a direction along the opposite light-incident surface; and
one end of each of the rear stripe structures is connected to the stripe structures, and the other end of each of the rear stripe structures is connected to the opposite light-incident surface, and each of the rear stripe structures inclines relative to the hole.

18. The light guide plate of claim 14 wherein
one end of each of the stripe structures in the first grouping is connected to the light-incident surface, the other end of each of the stripe structures in the first grouping extends toward a border of the front blank portion;
one end of each of the stripe structures in a second grouping is connected to the light-incident surface, and the other end of each of the stripe structures in the second grouping is connected to the opposite light-incident surface; one end of each of the stripe structures in a third grouping is connected to the light-incident surface, and the other end of each of the stripe structures in the third grouping extends to positions level with two opposite sides of the hole in a direction along the opposite light-incident surface; and
each of the rear stripe structures is an arc structure which surrounds the hole.

19. The light guide plate of claim 14, wherein
one end of each of the stripe structures in the first grouping is connected to the light-incident surface, the other end of each of the stripe structures in the first grouping extends toward the border of the front blank portion;
one end of each of the stripe structures is connected to the light-incident surface, the other end of each of the stripe structures in a second grouping is connected to the opposite light-incident surface; and
an extending direction of the rear stripe structures in a first grouping is parallel to the opposite light-incident surface, one end of each of the rear stripe structures in a second grouping is connected to the opposite light-incident surface, the other end of each of the rear stripe structures in the second grouping extends to the hole.

20. A light guide plate, comprising:
a main body having an optical surface, a light-incident surface and an opposite light-incident surface, wherein the light-incident surface and the opposite light-incident surface are respectively connected to two opposite sides of the optical surface, wherein the main body has a hole formed on the optical surface, and a front blank portion is located adjacent to a side of the hole in a direction facing towards the light-incident surface, and a rear structure portion is located adjacent to a side of the hole in a direction facing towards the opposite light-incident surface; and
a plurality of stripe structures located on the optical surface except for the hole, the front blank portion and the rear structure portion;
wherein the front blank portion is a region with no structure;
wherein each of the stripe structures in a first grouping is pointed to the hole, extends toward the hole near the light-incident surface but is not connected to the hole to keep the front blank portion between the stripe structures and the hole;
wherein a plurality of rear stripe structures are located in the rear structure portion of the optical surface, and wherein the rear stripe structures are intersected with each other.

* * * * *